United States Patent
Schuler et al.

(10) Patent No.: US 12,417,689 B2
(45) Date of Patent: Sep. 16, 2025

(54) DEVICE, SYSTEM, AND METHOD FOR ELECTRONIC ACCESS CONTROL TO REUNIFY PERSONS

(71) Applicant: MOTOROLA SOLUTIONS, INC., Chicago, IL (US)

(72) Inventors: Francesca Schuler, Chicago, IL (US); Jody A. Stowell, Chicago, IL (US); Kiesha Grant, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 477 days.

(21) Appl. No.: 17/538,210

(22) Filed: Nov. 30, 2021

(65) Prior Publication Data

US 2023/0169807 A1     Jun. 1, 2023

(51) Int. Cl.
*G08B 21/02*     (2006.01)
*G06N 20/00*     (2019.01)

(52) U.S. Cl.
CPC ......... *G08B 21/0269* (2013.01); *G06N 20/00* (2019.01)

(58) Field of Classification Search
CPC .... G08B 21/0269; G06N 20/00; G06N 3/006; G06N 3/09; G06N 3/126; G06N 5/01; G06N 7/01; G06N 20/10; G06N 20/20; G07C 9/00571; G07C 9/00896; G07C 9/00904
See application file for complete search history.

(56) References Cited

U.S. PATENT DOCUMENTS

| | | | |
|---|---|---|---|
| 10,403,125 | B2 | 9/2019 | Viramontez |
| 10,991,226 | B1 | 4/2021 | Vesterman et al. |
| 2017/0024839 | A1* | 1/2017 | Klein .................. G06Q 90/205 |
| 2019/0172337 | A1* | 6/2019 | Viramontez ......... G08B 25/016 |
| 2021/0166533 | A1* | 6/2021 | Derickson .............. G08B 7/066 |
| 2021/0193336 | A1* | 6/2021 | Nemeth ................ G08B 7/066 |

OTHER PUBLICATIONS

Baek et al, "Real-time fire detection system based on dynamic time warping of multichannel sensor networks," Fire Safety Journal, Jul. 2021, https://doi.org/10.1016/j.firesaf.2021.103364.*
Baek—Real-time File Detection (Year: 2021).*
(Continued)

*Primary Examiner* — Said M Elnoubi
(74) *Attorney, Agent, or Firm* — PERRY + CURRIER INC.

(57) ABSTRACT

A device, system, and method for electronic access control to reunify persons is provided. A device determines, using electronic data, a modality of an incident associated with a premises. The device determines: one or more routes associated with the premises and the modality; and electronic reunification data associated with the modality, the electronic reunification data defining one or more first persons and one or more second persons that are to meet in association with the incident and in accordance with the one or more routes. The device controls access points at the premises, along the one or more routes, to one or more of unlock, lock, open, or close. The device transmits one or more notifications to one or more communication devices, indicative of the electronic reunification data.

20 Claims, 5 Drawing Sheets

(56) References Cited

OTHER PUBLICATIONS

Baek et al, "Real-time fire detection system based on dynamic time warping of multichannel sensor networks," Fire Safety Journal, Jul. 2021 (Year: 2021).*

Starkey, Evan, "A Guide to Parent-Student Reunification for Schools", dated Jun. 1, 2021, downloaded from https://dentakid.com/parent-student-reunification/.

Raptor Technologies—https://raptortech.com/protect-your-school/ downloaded Nov. 24, 2021.

* cited by examiner

DEVICE, SYSTEM, AND METHOD FOR ELECTRONIC ACCESS CONTROL TO REUNIFY PERSONS

BACKGROUND OF THE INVENTION

Increasingly, access points, such as doors, and the like, in buildings, such as smart buildings and the like, are electronically controlled by central computing devices. When incidents occur in such buildings, such as schools, the access points should be electronically controlled.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
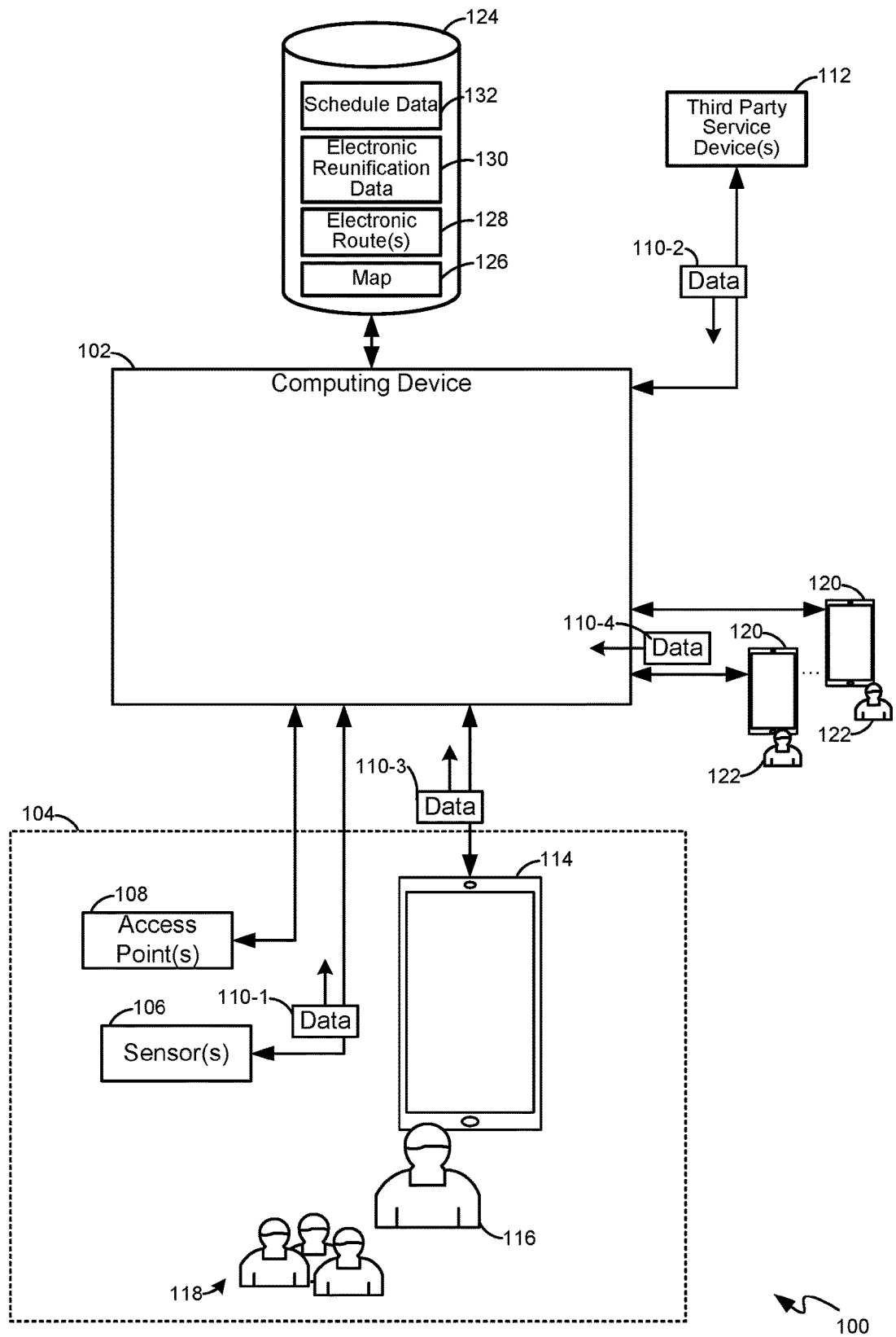
FIG. 1 is a system for electronic access control to reunify persons, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Increasingly, access points, such as doors, and the like, in buildings (or any other suitable premises), such as smart buildings and the like, are electronically controlled by a central computing device. When incidents occur at such premises (e.g., such as schools), the access points should be electronically controlled, for example to implement an evacuation plan to reunify occupants of the premises, such as students, with certain persons. Thus, there exists a need for an improved technical method, device, and system for electronic access control to reunify persons.

Hence, provided herein is a device, system, and method for electronic access control to reunify persons. In particular, an incident may occur at a premises, and the incident may be classified according to a particular modality, such as an active incident, a false incident, a preventive incident, and an incident drill and the like, which may result in different types of evacuation plans and/or different people, with which to reunify the occupants of the premises. Using a school as an example, an incident may occur that is associated with the school, and which may be inside or outside the school. Such an incident may include, but is not limited to, a fire, a fire alarm being pulled (e.g., without necessarily a fire actually occurring), a report of a fire (e.g., without actual verification of a fire), a fire drill, and the like, each of which may correspond to a different modality of a fire such as, respectively, an active incident, a false incident, a preventive incident, and an incident drill.

Given types of modalities may have different associated electronic routes at the school and/or given modalities may require different determinations of an electronic route. For example, an electronic route may comprise electronic data indicating which access points, such as doors, are to be controlled to open and/or close, and/or unlock and/or lock, to implement a route through the school to evacuate the school; the electronic route may further include timing and/or a schedule for opening/closing, and/or unlocking/locking access points. As such, a computing device provided herein is generally enabled to control access points (e.g., according to electronic routes) along one or more routes of a premises, such as a school, to assist persons at the premises with evacuating the premises, and such control may depend on a determined modality of an incident.

For example, when a fire occurs and fire alarms are triggered by one or more fire detectors (e.g., smoke detectors and/or temperature sensors), such that the fire is classified as an active incident, electronic data from the one or more fire detectors may indicate locations of the fire, which may alter an existing electronic route to direct occupants of the premises away from the fire. Similarly, when fire alarms are triggered by a fire alarm box (e.g., due to manual pulling of switch at the fire alarm box), electronic data from the one or more fire detectors and/or cameras and/or video cameras may indicate whether or not a fire is actually occurring; when such a determination cannot be made and/or such a determination indicates no fire, then the fire alarms being triggered may be classified as a false incident or a preventive incident and either an existing electronic route may be implemented or the existing electronic route may be altered based on information in video data from the cameras, for example to direct occupants of the premises away from a different "threat" at the premises. Similarly, a scheduled fire drill may occur, which may be an incident drill, and the existing electronic route may be implemented. Hence, one modality of an incident of a fire may have a different electronic route, and hence a different route through the school, than another modality. Furthermore, the computing device may transmit a given electronic route to communication device of a teacher, and the like, to cause the teacher to lead the students along one or more respective evacuation routes, and the computing devices may control access points, along the one or more routes, to one or more of unlock, lock, open, or close.

Similarly, different modalities of an incident may have different associated electronic reunification data. For example, such electronic reunification data may comprise information indicating persons, with which occupants of the premises are to be reunified, for example by following a route. Indeed, an electronic route may be altered and/or generated to promote such reunification, and which may be further based on electronically detected locations of the persons with which occupants of the premises are to be reunified, which may be detected via cameras, registration devices, and the like. Again using the example of a school, occupants of the premises may be students, and the persons, with which occupants of the premises are to be reunified may comprise parents, teachers, school administrators, first responders, and the like, depending on the modality of the incident. For example, for an active incident, parents may be electronically notified of the incident to cause them to travel to the school, and register their location (e.g., using an application at a respective communication device) when they arrive at the school, for example at a designated meeting point, which may be a predetermined designated meeting point, or a designated meeting point selected to avoid the active incident. The computing device may implement an electronic route to direct students (e.g., via a teacher leading the students) to the designated meeting point. Similarly, for an incident drill, a predetermined designated meeting point may be designated where students meet with a school principal and/or a school administrator (e.g., a designated fire marshal), and the computing device may implement an electronic route to direct students (e.g., via a teacher leading the students) to the designated meeting point to meet with the school principal and/or the school administrator. As such, the computing device is further configured to transmit one or more notifications to one or more communication devices (e.g., of the teachers), indicative of the electronic reunification data, for example to cause the teachers to reunify students with persons indicated in the electronic reunification data.

An aspect of the present specification provides a method comprising: determining, via a computing device, using electronic data, a modality of an incident associated with a premises; determining, via the computing device: one or more routes associated with the premises and the modality; and electronic reunification data associated with the modality, the electronic reunification data defining one or more first persons and one or more second persons that are to meet in association with the incident and in accordance with the one or more routes; controlling, via the computing device, access points at the premises, along the one or more routes, to one or more of unlock, lock, open, or close; and transmitting, via the computing device, one or more notifications to one or more communication devices, indicative of the electronic reunification data Another aspect of the present specification provides a device comprising: a communication unit; and a controller configured to: determine, using electronic data, a modality of an incident associated with a premises; determine: one or more routes associated with the premises and the modality; and electronic reunification data associated with the modality, the electronic reunification data defining one or more first persons and one or more second persons that are to meet in association with the incident and in accordance with the one or more routes; control, via the communication unit, access points at the premises, along the one or more routes, to one or more of unlock, lock, open, or close; and transmit, via the communication unit, one or more notifications to one or more communication devices, indicative of the electronic reunification data Each of the above-mentioned aspects will be discussed in more detail below, starting with example system and device architectures of the system in which the embodiments may be practiced, followed by an illustration of processing blocks for achieving an improved technical method, device, and system for electronic access control to reunify persons.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions, which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the drawings.

Attention is directed to FIG. 1, which depicts an example system 100 for electronic access control to reunify persons. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks, and the like.

The system 100 comprises a computing device 102 associated with a premises 104. The computing device 102 may be located on or off the premises 104 and may comprise a server and/or a cloud computing device, and/or any suitable computing device in any suitable format. In some examples, functionality of the computing device 102 may be distributed over a plurality of servers, a plurality of cloud computing devices and the like. Details of the computing device 102 are described in more detail below with respect to FIG. 2.

The premises 104 may comprise any suitable building, and the like, which includes one or more sensors 106 and one or more access points 108 in communication with the computing device 102. The one or more sensors 106 are generally configured to provide electronic data 110-1 to the computing device 102 such that the computing device 102 may determine that an incident associated with the premises 104 may be occurring and/or so that the computing device 102 may verify whether an incident is occurring. The one or more sensors 106 may include, but are not limited to, fire detectors, smoke detectors, temperature sensors, chemical sensors, fire alarms, fire alarm boxes, metal detectors, cameras, video cameras, microphones, and the like.

The one or more access points 108 may comprise one or more electronically controlled doors, and the like, which include access control mechanisms that may be controlled by the computing device 102 to one or more of open, close, unlock, or lock a respective access point 108.

Furthermore, while the premises 104 may comprise a smart building, where the one or more access points 108 are controlled based on electronic data, for example from the one or more sensors 106, the premises 104 may include any suitable premises, which may include indoor spaces and/or outdoor spaces.

Furthermore, the computing device 102 may determine whether an incident is occurring, and/or may verify whether an incident is occurring, based on electronic data from sources other than the one or more sensors 106.

For example, as depicted, the computing device 102 is in communication with one or more third party service devices 112 (e.g., servers, cloud computing devices, and the like), which may include, but is not limited to, social media servers, weather service servers, geographic information service (GIS) servers, and the like. In particular, the computing device 102 may receive, upon request and/or in a push service, electronic data 110-2 from the one or more third party service devices 112 indicative of an incident associated with the premises 104, such as an approaching storm, a weather-related incident (e.g., such as a flood indicated by GIS data), a criminal act taking place at, or near, the premises 104 (e.g., that has not been detected by the sensors 106), and the like.

In another example, a communication device operated by a person may be used to transmit electronic data to the computing device 102 indicative of an incident and/or indicative of verification of an incident. Such a communication device may be operated by an occupant of the premises 104, a first responder, a dispatcher and/or operator of public-safety answering point (PSAP) and the like.

For example, as depicted, the system 100 further comprises at least one communication device 114 operated by at least one respective user 116 who is an occupant of the premises 104 who is tasked with reunifying one or more first persons 118 with other persons in the event of an incident. Furthermore, as depicted, the system 100 further comprises communication devices 120 operated by one or more second persons 122, who may comprise persons, with which the first persons 118 are to be reunified in the event of an incident. One or more of the communication devices 114, 120 may transmit respective electronic data 110-3, 110-4 to the computing device 102 indicative of an incident and/or indicative of verification of an incident.

Hereafter the electronic data 110-1, 110-2, 110-3, 110-4 will be interchangeably referred to, collectively, as the electronic data 110 and, generically, as a set of electronic data 110 and/or electronic data 110.

Furthermore, the term "reunify", and the like, is understood to include the one or more first persons 118 meeting the one or more second persons 122 regardless of whether the persons 118, 122 have previously met or not. For example, "reunification", and the like, is understood in the context of incidents, in which persons are to meet to assist with one or more of the persons reaching a state of safety, and the like.

Hereafter, an example of the premises 104 comprising a school will be used, however the premises 104 may comprise any suitable premises including, but not limited to, a prison, an office building, among other possibilities. However, in the example of a school, the user 116 may be a teacher of students in a classroom, and hence the one or more first persons 118 may comprise one or more students; in this example, the one or more second persons 122 may comprise any suitable persons, with which the students are to be reunited when an incident occurs. Hence, the one or more second persons 122 may comprise one or more parents of one or more of the students, a school principal, another teacher, a school administrator, a school fire marshal, a first responder (e.g., a police officer, a fire fighter, an emergency medical technician, etc.), and the like.

Hence, while only one communication device 114, one respective user 116 and one group of first persons 118 is depicted, it is understood that the system 100 may comprise more than one communication device 114, more than one respective user 116 and more than one group of first persons 118 including, but not limited to, different teachers (e.g., different users 116), operating different respective communication devices 114, and supervising different groups of students (e.g., different groups of first persons 118). Similarly, while more than one communication device 120 and more than one second persons 122 are depicted, it is understood that the system 100 may comprise as few as one communication device 120 and one second person 122.

It is further understood that the computing device 102 has access to contact information of the communication devices 114 of the system 100 such that the computing device 102 may transmit messages to the communication devices 114 of the system 100. For example, communication devices 114 of the system 100 may register with the computing device 102 in a registration process, such as by providing a respective email address, phone number, and the like, to the computing device 102, and/or communication devices 114 of the system 100 may register with the computing device 102 via an application installed at the communication devices 114. Furthermore, communication devices 114 of the system 100 may comprise respective location determining devices, including, but not limited to Global Positioning System (GPS) devices, and report their respective locations to the computing device 102 periodically and/or upon request from the computing device 102, and the like.

It is further understood that the communication devices 120 may similarly register with the computing device 102, for example via an application, and the like, and similarly report their respective locations to the computing device 102.

The communication devices 114, 120 are furthermore examples of devices, from which electronic data may be transmitted to the computing device 102, to report an incident and/or verify an incident. The communication devices 114, 120 may comprise any suitable mobile device, including, but not limited to, cell phones, two-way radios, and the like.

As depicted, the system 100 further comprises a memory 124 (e.g., depicted in the form of a database, but which may be in any suitable format, such as a cloud computing device, and/or incorporated into the computing device 102) that stores, as depicted, an electronic map 126 of the premises 104, one or more electronic routes 128 through the premises 104, and electronic reunification data 130.

In particular, the electronic map 126 may comprise a map of the premises 104 in any suitable electronic format. The one or more electronic routes 128 through the premises 104 comprise routes (e.g., paths) through the premises 104, for example from respective locations, such as rooms, classrooms, and the like, to respective meeting points. Furthermore, the one or more electronic routes 128 may comprise electronic data indicating which of the one or more access point 108 to open and/or close, and/or unlock and/or lock, to implement a respective electronic routes 128 through the premises 104, for example to evacuate the premises 104; the one or more electronic routes 128 may further include timing and/or a schedule for opening/closing, and/or unlocking/locking respective access points 108. Furthermore, while not depicted, the one or more electronic routes 128 may be combined with the electronic map 126, and/or the electronic map 126 may be optional in such examples.

In yet further examples, the one or more electronic routes 128 may be modified by the computing device 102 based, for example, on the electronic data 110. Furthermore, in some examples, the computing device 102 may generate an electronic route 128 based on the electronic data 110.

In a particular example, the electronic data 110 may indicate that an active incident of a fire is occurring in the premises 104 (e.g., a modality of such an incident comprises an "active incident"), and the computing device 102 may retrieve a predetermined electronic route 128 for evacuating the first persons 118 from their respective location to a given meeting point. However, the electronic data 110 may indicate that the fire is located along the route indicated by the predetermined electronic route 128 and the computing device 102 may modify the predetermined electronic route 128 to avoid the fire. Alternatively, the computing device 102 may generate an electronic route 128 for evacuating the first persons 118 from their respective location to a given meeting point to avoid the fire.

It is understood that the computing device 102 may further control the access points 108 at the premises 104, along a route indicated by an electronic route 128, to one or more of unlock, lock, open, or close. For example, the computing device 102 may unlock and/or open access points 108 that the first persons 118 and the user 116 are to move through along the route.

However, the computing device 102 may lock and/or close other access points 108 to assist at containing the fire and/or to prevent persons on the premises 104 from accessing the fire. However, the computing device 102 may later unlock and/or open such access points 108 for first responders, such as fire fighters, such that the first responders may access the fire (e.g., to fight the fire). Such control may occur after a given time period (e.g., after closing and/or locking such access points 108) and/or upon receiving a command from a communication device (e.g., being operated by a first responder, and/or a dispatcher, and/or a school administrator, and the like), and/or upon detecting that a first responder is adjacent such an access point 108 (e.g., via video data and/or images received from video cameras of the sensors 106), among other possibilities.

Furthermore, the computing device 102 may one or more of unlock, lock, open, or close respective access points 108 according to a schedule. For example, along a route, the computing device 102 may unlock and/or open given access points 108 for a given time period and/or until the first persons 118 and the user 116 are through the given access points 108 (e.g., as detected via video data and/or images received from video cameras of the sensors 106), and then lock and/or close the given access points 108.

While detecting of persons and/or first responders, and the like, being adjacent and/or through access points 108 is described with respect to detection via video data and/or images received from video cameras of the sensors 106, in other examples, one or more of the access points 108 may be equipped with card readers, and the like, configured to read a badge and/or card (e.g., a radio-frequency identification (RFID) card) of a person and/or a first responder, such that the card reader transmits identification data from the card to the computing device 102, which may verify the identification data (e.g., via an employee database and/or a first responder database, and/or other suitable rules) and open and/or unlock an access point 108 accordingly.

Hence, the electronic routes 128 may comprise any suitable combination of: information identifying respective routes though the premises 104; rules for generating respective routes through the premises 104; rules for one or more of unlocking, locking, opening, or closing access points 108; schedules for one or more of unlocking, locking, opening, or closing access points 108; commands (e.g., for transmission to access points 108) for one or more of unlocking, locking, opening, or closing access points 108; and the like.

Furthermore, an electronic route 128 may depend on a modality for an incident. For example, the term "modality", as used herein with respect to an incident, may be understood to include a mode of an incident (e.g., which is understood to be different from a type of an incident, such as a fire or a flood, and the like). Such modes may include, but are not limited to:

An active incident, which is understood to include incidents that are presently (e.g., actively) occurring according to a respective type. Examples of active incidents may include, but are not limited to, a presently occurring fire, a presently occurring criminal act, a presently occurring weather incident (e.g., such as a flood), and the like. In some examples, an active incident may comprise a presently occurring incident that has been verified as being presently occurring and/or active (e.g., by a witness operating a respective communication device 114, 120 to transmit respective electronic data 110, and/or verified using more than one set of electronic data 110).

A false incident, which is understood to include incidents, which were reported as possibly occurring and/or determined as possibly occurring, but which could not and/or cannot be verified. Examples of such a false incidents may include, but are not limited to, a determination of a fire via receipt of electronic data 110 from a fire alarm box (e.g., a fire alarm was pulled), but no detection of the fire via a smoke detector and/or a temperature sensor and the like. In some examples, a false incident may comprise an incident that cannot be verified and/or which is reported as possibly not occurring (e.g., by a witness operating a respective communication device 114, 120 to transmit respective electronic data 110, which indicates, for example, that there is no visible fire and/or smoke at the premises 104 even though a fire alarm was pulled).

A preventive incident, which is understood to include incidents that may occur in response to a threat of an incident. Examples of preventive incidents may include, but are not limited to, incidents that may occur in response to a threat of setting a fire at the premises 104, and/or a threat of performing a criminal act at the premises 104, that may be posted on social media (e.g., and received via the electronic data 110-2 received from one or more of the third party service devices 112). As such, a preventive incident may include, but is not limited to, actions that may occur at premises 104 to prevent such threats.

An incident drill, which is understood to include drills that may occur to practice responding to an active incident, or another modality of an incident. Examples of incident drills may include, but are not limited to, a fire drill, a school evacuation drill, a lockdown drill, and the like. In some examples, an incident drill may occur according to schedule data 132 stored at the memory 124, which may indicate times and/or dates for scheduled incident drills.

The schedule data 132 may further comprise schedules for the user 116, and/or other users 116, such as respective class schedules (e.g., when users 116 of the system 100 comprise teachers, when the premises 104 comprises a school), such that the computing device 102 has access to scheduled locations of the users 116 and the respective first persons 118 they may be supervising. Indeed, the schedule data 132 may further include schedules, such as class schedules, for the first persons 118 and may further include absentee information indicative of when a given first person 118 is present or absent at the premises 104 (e.g., which may be determined via a roll call process and/or an electronic registration process implemented, for example, via a communication device 114 and/or card-readers at the premises 104, and the like).

Returning to the electronic routes 128, when a modality for an incident comprises an incident drill, an associated electronic route 128 may indicate that the first persons 118, and the user 116, are to follow one route, which may be predetermined. However, when a modality for an incident comprises an active incident, an associated electronic route 128 may indicate that the first persons 118, and the user 116, are to follow a second route (e.g., which may be the same as, or different from, the first route), which may be dynamically determined based on the electronic data 110.

As depicted, the memory 124 further stores sets of electronic reunification data 130 defining one or more first persons (e.g., the first persons 118) and one or more second persons (e.g., the second persons 122) that are to meet in association with an incident and in accordance with the one or more routes of the electronic routes 128. Furthermore, the electronic reunification data 130 may be stored in association with respective modalities of an incident.

In particular, the electronic reunification data 130 may depend on a modality for an incident. For example, when a modality for an incident comprises an active incident, associated electronic reunification data 130 may indicate that the first persons 118 are to be reunited with second persons 122 who are their parents. However, when a modality for an incident comprises an incident drill, associated electronic reunification data 130 may indicate that the first persons 118 are to be reunited with a school administrator, such as a teacher and/or a fire marshal, and the like.

Hence, the electronic routes 128 and the electronic reunification data 130 may both depend on a modality of an incident. Furthermore, while the electronic routes 128 and the electronic reunification data 130 are depicted as being separate, in other examples, the electronic routes 128 may be combined with the electronic reunification data 130. Furthermore, the electronic routes 128 and the electronic reunification data 130 may comprise an evacuation plan for evacuating the first persons 118 from the premises 104.

Furthermore, respective electronic reunification data 130 may be stored in association with different incident modalities, for different incident types. For example, for an incident of "fire" different respective electronic reunification data 130 may be stored in association with modalities of an active fire incident, a false fire incident (e.g., falsely reported and/or determined fire), a preventive fire incident, and a fire incident drill. In other words, for each of these modalities of a "fire", respective electronic reunification data 130 may indicate respective second persons 122, which with the first persons 118 are to reunite. Furthermore, in some examples, a respective electronic route 128 may indicate a respective route to evacuate the first persons 118 from the premises 104 to reunite the first persons 118 with the second persons 122 indicated by the respective electronic reunification data 130. Similar respective electronic reunification data 130 (and respective electronic routes 128) may be stored for modalities of incidents of other types, such as flooding, different criminal acts, and the like.

Figure 2:
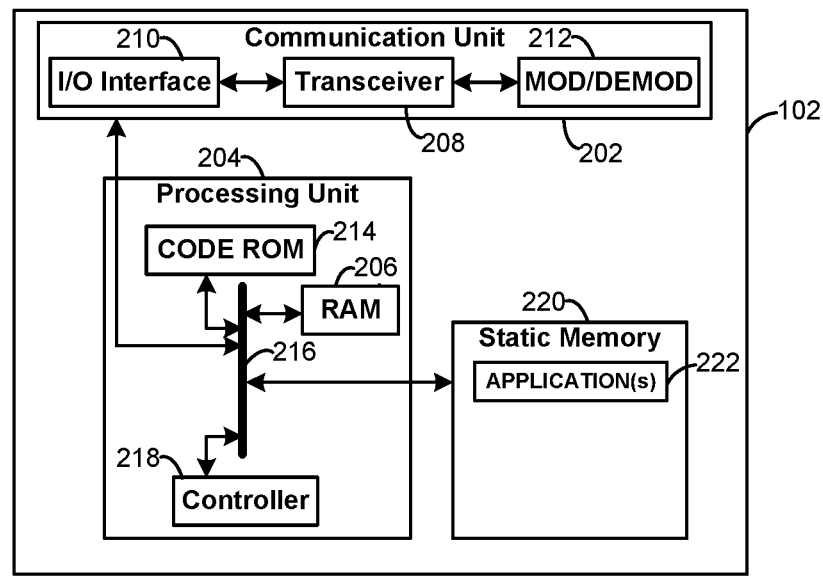
FIG. 2 is a device diagram showing a device structure of a communication device for electronic access control to reunify persons, in accordance with some examples.

Attention is next directed to FIG. 2, which depicts a schematic block diagram of an example of the computing device 102. While the computing device 102 is depicted in FIG. 2 as a single component, functionality of the computing device 102 may be distributed among a plurality of components, such as a plurality of servers and/or cloud computing devices.

As depicted, the computing device 102 comprises: a communication unit 202, a processing unit 204, a Random-Access Memory (RAM) 206, one or more wireless transceivers 208, one or more wired and/or wireless input/output (I/O) interfaces 210, a combined modulator/demodulator 212, a code Read Only Memory (ROM) 214, a common data and address bus 216, a controller 218, and a static memory 220 storing at least one application 222. The controller 218 is understood to be communicatively connected to other components of the computing device 102 via the common data and address bus 216. Hereafter, the at least one application 222 will be interchangeably referred to as the application 222.

Furthermore, while the memories 206, 214 are depicted as having a particular structure and/or configuration, (e.g., separate RAM 206 and ROM 214), memory of the computing device 102 may have any suitable structure and/or configuration.

While not depicted, the computing device 102 may include one or more of an input device and/or a display screen, which, when present, may be communicatively coupled to the controller 218.

As shown in FIG. 2, the computing device 102 includes the communication unit 202 communicatively coupled to the common data and address bus 216 of the processing unit 204.

The processing unit 204 may include the code Read Only Memory (ROM) 214 coupled to the common data and address bus 216 for storing data for initializing system components. The processing unit 204 may further include the controller 218 coupled, by the common data and address bus 216, to the Random-Access Memory 206 and the static memory 220.

The communication unit 202 may include one or more wired and/or wireless input/output (I/O) interfaces 210 that are configurable to communicate with other components of the system 100. For example, the communication unit 202 may include one or more wired and/or wireless transceivers 208 for communicating with other suitable components of the system 100. Hence, the one or more transceivers 208 may be adapted for communication with one or more communication links and/or communication networks used to communicate with the other components of the system 100. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP ($3^{rd}$ Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication unit 202 may further include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 may also be coupled to a combined modulator/demodulator 212.

The controller 218 may include ports (e.g., hardware ports) for coupling to other suitable hardware components of the system 100.

The controller 218 may include one or more logic circuits, one or more processors, one or more microprocessors, one or more GPUs (Graphics Processing Units), and/or the controller 218 may include one or more ASIC (application-specific integrated circuits) and one or more FPGA (field-programmable gate arrays), and/or another electronic device. In some examples, the controller 218 and/or the computing device 102 is not a generic controller and/or a generic device, but a device specifically configured to implement functionality for electronic access control to reunify persons. For example, in some examples, the computing device 102 and/or the controller 218 specifically comprises a computer executable engine configured to implement functionality for electronic access control to reunify persons.

The static memory 220 comprises a non-transitory machine readable medium that stores machine readable instructions to implement one or more programs or applications. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functionality of the computing device 102 as described herein are maintained, persistently, at the memory 220 and used by the controller 218, which makes appropriate utilization of volatile storage during the execution of such programming instructions.

Figure 3:
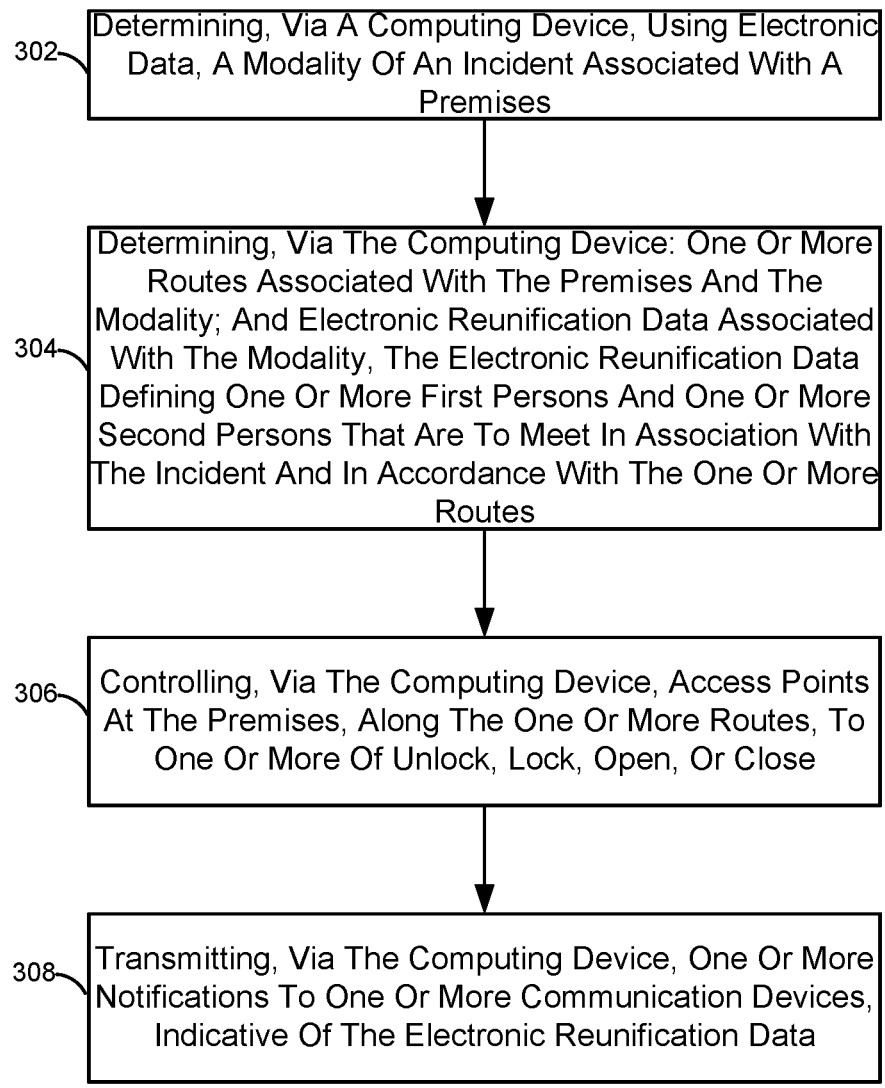
FIG. 3 is a flowchart of a method for electronic access control to reunify persons, in accordance with some examples.

Furthermore, the memory 220 stores instructions corresponding to the at least one application 222 that, when executed by the controller 218, enables the controller 218 to implement functionality for electronic access control to reunify persons, including but not limited to, the blocks of the method set forth in FIG. 3.

Furthermore, while not depicted, the memory 124 may be combined, and/or partially combined, with the memory 220, such that the memory 220 may store one or more of the electronic map 126, the electronic routes 128, the electronic reunification data 130 or the schedule data 132.

In illustrated examples, when the controller 218 executes the one or more applications 222, the controller 218 is enabled to: determine, using electronic data, a modality of an incident associated with a premises; determine: one or more routes associated with the premises and the modality; and electronic reunification data associated with the modality, the electronic reunification data defining one or more first persons and one or more second persons that are to meet in association with the incident and in accordance with the one or more routes; control access points at the premises, along the one or more routes, to one or more of unlock, lock, open, or close; and transmit (e.g., via the communication unit 202) one or more notifications to one or more communication devices, indicative of the electronic reunification data.

The application 222 may include numerical algorithms to determine one or more of a modality of an incident, routes (e.g., electronic routes 128) or electronic reunification data 130.

Alternatively, the application 222 may include machine learning and/or deep-learning based algorithms and/or neural networks, and the like, which have been trained to determine one or more of a modality of an incident, routes (e.g., electronic routes 128) or electronic reunification data 130. Furthermore, in these examples, the application 222 may initially be operated by the controller 218 in a training mode to train the machine learning and/or deep-learning based algorithms and/or neural networks of the application 222 to determine one or more of a modality of an incident, more routes (e.g., electronic routes 128) or electronic reunification data 130.

The one or more machine-learning algorithms and/or deep learning algorithms and/or neural networks of the application 222 may include, but are not limited to: a generalized linear regression algorithm; a random forest algorithm; a support vector machine algorithm; a gradient boosting regression algorithm; a decision tree algorithm; a generalized additive model; neural network algorithms; deep learning algorithms; evolutionary programming algorithms; Bayesian inference algorithms, reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some environments, such as schools, prisons, and the like. Any suitable machine-learning algorithm and/or deep learning algorithm and/or neural network is within the scope of present examples.

While details of the communication devices 114, 120 are not depicted, the communication devices 114, 120 may have components similar to the computing device 102 but adapted, for the respective functionality thereof. For example, the communication devices 114, 120 may include respective display screens for rendering notifications, and/or respective devices and/or applications for registering a location with the computing device 102, and the like.

Attention is now directed to FIG. 3, which depicts a flowchart representative of a method 300 for electronic access control to reunify persons. The operations of the method 300 of FIG. 3 correspond to machine readable instructions that are executed by the computing device 102, and specifically the controller 218 of the computing device 102. In the illustrated example, the instructions represented by the blocks of FIG. 3 are stored at the memory 220 for example, as the application 222. The method 300 of FIG. 3 is one way that the controller 218 and/or the computing device 102 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 218 and/or the computing device 102 determines, using the electronic data 110, a modality of an incident associated with the premises 104.

For example, the electronic data 110 may comprises one or more of:

Image data and/or video data from cameras and/or video cameras (e.g., one or more of the sensors 106) associated with the premises 104. Such cameras and/or video cameras may be located within the premises 104 or external to the premises 104, and/or in any other suitable location. In these examples, the computing device 102 is understood to include image and/or video analysis functionality (e.g., as a component of the application 222). The image data and/or video data may include, but is not limited to, images, and the like, indicative of an incident, such as images of a fire and/or images of a person carrying a weapon, and the like, at the premises 104.

Fire detector data associated with the premises 104. For example, such fire detector data may be generated by one or more fire detectors (e.g., of the sensors 106) and may indicate detection of a fire and/or smoke at the premises 104. Examples of such fire detector data may include, but is not limited to, smoke detector data, temperature sensor data, among other possibilities.

Physical alarm data associated with the premises 104. For example, such physical alarm data may be generated by one or more fire alarm boxes (e.g., of the sensors 106) and may indicate that an alarm has been "pulled" at the premises 104.

Sensor data from the sensors 106 associated with the premises 104. For example, any other type of sensor data, generated by any other type of sensor 106 associated with the premises 104, is within the scope of the present specification including, but not limited to, metal detector data (e.g., from a metal detector of the sensors 106), chemical sensor data (e.g., from a chemical sensor of the sensors 106), and the like.

Social media data associated with the premises 104. For example, social media data may include, but is not limited to, information from one or more social media servers of the third party service devices 112, which indicate a threat to the premises 104, such as a threat of a fire, a threat of a criminal act, and the like.

GIS (geographic information service) data associated with the premises 104. For example, GIS data may include, but is not limited to, information from one or more GIS servers of the third party service devices 112, which indicates a geographic-related threat to the premises 104, such as a location of a flood, a tornado, and the like.

Weather data associated with the premises 104. For example, weather data may include, but is not limited to, information from one or more weather servers of the third party service devices 112, which indicates a weather-related threat to the premises 104, such as a weather forecast for heavy rain, an ice storm, and the like. In some examples, weather data and GIS data may be combined.

A schedule associated with the premises 104, such as the schedule data 132, which may indicate times and/or dates for incident drills, among other possibilities.

Furthermore, as has been previously described, the modality of the incident determined at the block 302 may comprise one of: an active incident; a false incident; a preventive incident; and an incident drill. However, any suitable modality of an incident is within the scope of the present specification. Furthermore, different incident types may have different associated modalities. For example, an incident type of a fire may have associated modalities of an active incident, a false incident, a preventive incident, and an incident drill; however, an incident type of a weapon detected on the premises 104 may have associated modalities of an active incident, a preventive incident, and an incident drill (e.g., a false incident may be excluded as a modality as a potential weapon on the premises 104 may always be treated as an active incident).

At a block 304, the controller 218 and/or the computing device 102 determines: one or more routes associated with the premises 104 and the modality; and electronic reunification data 130 associated with the modality, the electronic reunification data 130 defining one or more of the first persons 118 and one or more of the second persons 122 that are to meet in association with the incident and in accordance with the one or more routes.

For example, once the controller 218 and/or the computing device 102 determines the modality of the incident at the block 302, an associated electronic route 128 and an associated set of electronic reunification data 130 may be selected from the memory 124. Alternatively, the controller 218 and/or the computing device 102 may generate one or more of an electronic route 128 or electronic reunification data 130 based on the electronic data 110.

For example, determining the electronic reunification data 128 may comprise the controller 218 and/or the computing device 102 selecting the electronic reunification data 128 from a plurality of sets of electronic reunification data 128, based on the modality.

While only one set of one or more first persons 118 and one or more second persons 122 is described herein, it is understood that, at the block 304, the controller 218 and/or the computing device 102 may determine a plurality of electronic routes 128 and/or a plurality of sets of electronic reunification data 130, for example for different sets of first persons 118. For example, continuing with the example of the premises 104 comprising a school, different groups of students may be in different classrooms, and the like, at the premises 104, and an electronic route 128 and a set of electronic reunification data 130 may be determined on a per classroom basis. Alternatively, an electronic route 128 may be determined on a per classroom basis and a set of electronic reunification data 130 may be determined that is not classroom specific. Alternatively, as the computing device 102 may have access to locations of users 116 and/or first persons 118, an electronic route 128 and a set of electronic reunification data 130 may be determined on a per location basis and/or a per person basis.

Furthermore, while present examples are described with respect to electronic reunification data 130 being for a group of first persons 118, in other examples, electronic reunification data 130 may be specific to a given first person 118. For example, electronic reunification data 130 may indicate that a given first person 118 is to be reunited with a specific second person 122, such a given parent, and the like, but not with another person (e.g., such as a parent who is under a restraining order, and the like).

At a block 306, the controller 218 and/or the computing device 102 control access points 108 at the premises 104, along the one or more routes, to one or more of unlock, lock, open, or close. The control of the access points 108 generally occurs via the communication unit 202.

For example, given access points 108 may be controlled to unlock and/or open (e.g., according to a schedule) such that the first persons 118 may follow a route determined at the block 304.

Furthermore, other given access points 108 may be controlled to lock and/or close such that the first persons 118 may be prevented from being exposed to a threat (e.g., that is the subject of the incident, for which a modality is determined at the block 302, such as a fire) while following a route determined at the block 304.

Hence, at the block 306, the controller 218 and/or the computing device 102 control access points 108 at the premises 104 to assist the first persons 118 in following a route and/or to prevent the first persons 118 from being exposed to a threat.

At a block 308, the controller 218 and/or the computing device 102 transmits one or more notifications to one or more communication devices 114 indicative of the electronic reunification data 128. Transmission of the one or more notifications to the one or more communication devices 114 generally occurs via the communication unit 202.

Such notifications may comprise an indication of one or more of: the incident; the modality of the incident; a type of the incident, among other possibilities. Such notifications may further comprise an indication of a respective route. Hence, the communication device 114, having received a notification, may provide the notification at a display screen thereof, or any other suitable notification device, to inform the user 116 of the electronic reunification data 128 such that the user 116 is provided with an indication which the first persons 118 are to be reunited with respective second persons 122 (or vice versa), as well as a modality of the incident and/or a type of the incident, and the like, and/or a route to follow to reach a meeting point between the first persons 118 and the second persons 122. Examples of such a notification are described below with respect to FIG. 4.

The method 300 may include any other suitable features.

For example, the system 100 may include more than one communication device 114 operated by respective users 116 (e.g., a plurality of teachers in a plurality of classrooms supervising respective students (e.g., a plurality of groups of first persons 118), the further teacher operating a respective communication device 114). In these examples, the method 300 may further comprise the controller 218 and/or the computing device 102, for a given communication device 114, of one or more communication devices 114: selecting a given route, of the one or more routes (e.g., determined at the block 304) based on an associated user 116 of the given communication device 114; and including in a notification to the given communication device 114, the given route.

Put another way, when the system 100 comprises more than one communication device 114 operated by respective users 116, the controller 218 and/or the computing device 102 may determine a plurality of routes (e.g., a plurality of electronic routes 128) for the communication devices 114 and the respective users 116, and/or respective first persons 118, and select a respective route (e.g., a respective electronic route 128) for an associated user 116 of the given communication device 114. For example, a respective route (e.g., a respective electronic route 128) for an associated user 116 of the given communication device 114 may be selected based on a respective location of the associated user 116 of the given communication device 114, the respective route being from the respective location to a meeting point where reunification of respective first persons 118 is to occur with respective second persons 122. The respective route (e.g., a given route) may be included in the notification of the block 308.

In some examples, the method 300 may further comprise the controller 218 and/or the computing device 102: prior to determining the modality of the incident, (e.g., at the block 302) determining, using first electronic data 110, an initial incident; determining, using second electronic data 110, that the initial incident is a false incident, and the incident is a real incident; and in response to determining that the incident is the real incident, determining the modality of the incident.

Hence, for example, first electronic data 110 may indicate that a fire alarm box has been pulled and hence the controller 218 and/or the computing device 102 may initially determine that an initial incident may comprise a "fire". However, second electronic data 110, such as electronic data 110 from a video camera, may indicate that there is no fire, but rather there is a person on the premises 104 who is carrying a weapon (e.g., the fire alarm box may have been pulled due to someone at the premises 104 seeing the person). As such, the controller 218 and/or the computing device 102 may determine that the "fire" is a false incident, and that the incident of the block 302 is a real incident of a criminal act being committed at the premises 104. As such, at the block 302, rather than determining a modality of the "fire" incident, the controller 218 and/or the computing device 102 determines a modality of the "criminal act" incident.

Similarly, in some examples, the method 300 may further comprise the controller 218 and/or the computing device 102: determining, using electronic data 110, a plurality of incidents associated with the premises 104; and selecting, using the electronic data 110, the incident from the plurality of incidents according to one or more of: a weighting scheme; a type of the incident; a current time of day; a current occupancy of the premises, among other possibilities.

For example, the electronic data 110 may indicate that more than one incident may be occurring in association with premises 104, such as a suspicious package indicated by video data, and a fire indicated by physical alarm data, each of which may have different associated electronic routes 128 and/or different associated electronic reunification data 130 (e.g., which may not be implemented simultaneously). Hence, in some examples, the controller 218 and/or the computing device 102 may select an incident, for which to determine a modality from a plurality of incidents based on any suitable factors, which may include, but is not limited to:

- A type of the incident. For example, some incidents, such as a fire, may be assigned (e.g., via the application 222) a higher priority than other incidents, such as a suspicious package, and hence a first incident of relatively higher priority may be selected as an incident, for which to determine a modality (e.g., at the block 302), over a second incident of relatively lower priority.
- A type of electronic data 110 used to determine and/or verify the incident. For example, a first incident, such as a fire, that is determined and/or verified via video data (e.g., actual images of the fire are captured), may be of relatively higher priority than a second incident, such as a bomb threat, that is determined via social media data. Put another way, incidents that are determined and/or verified via a first type of electronic data 110, for example video data, may be assigned a higher relative priority than incidents determined and/or verified via a second type of electronic data 110, for example social media data. Hence, a first incident of relatively higher priority, as determined based on a first type of electronic data 110 used to determine the first incident, may be selected as an incident, for which to determine a modality (e.g., at the block 302), over a second incident of relatively lower priority, as determined based on a second type of electronic data 110 used to determine the second incident.
- Verification of an incident. For example, different incidents may be determined via a first sets of electronic data 110, such as a fire incident determined via physical alarm data, and a suspicious package incident determined via video data. However, one or more of the incidents may be verified, or not verified, via one or more second sets of electronic data 110. For example, the aforementioned fire incident may be determined via physical alarm data, and verified via one or more of fire sensor data, video data, electronic data 110 from a communication device 114 (e.g., which may include a user 116 viewing the fire incident and texting and/or calling in to verify the fire incident), among other possibilities. In contrast, the aforementioned suspicious package incident may be determined via video data and determined to be a false incident via one or more of further video data (e.g., from a video camera viewing a suspicious package from a different angle), electronic data 110 from a communication device 114 (e.g., which may include a user 116 viewing and/or opening the suspicious package incident and texting and/or calling in to verify that a suspicious package is a known package, such as a student's backpack, and the like), and the like. In these examples, a first incident that is verified may be assigned a higher relative priority than a second incident that is unverified, and/or a first incident that is verified may be assigned a higher relative priority than a second incident that is determined to be a false incident. Hence, a first incident of relatively higher priority, as determined based on the first incident being verified, may be selected as an incident, for which to determine a modality (e.g., at the block 302), over a second incident of relatively lower priority, as determined based the second incident not being verified and/or being determined to be a false incident based on second electronic data 110.
- A current time of day. For example, some incidents may be more likely to occur at certain times of day than other times of day. Hence, when the electronic data 110 indicates two incidents occurring at times when the premises 104 is generally unoccupied (e.g., as defined at, for example, the application 222, and which may comprise a range of times, such as 6 pm to 6 am, among other possibilities) a first incident that is more likely to be of relatively higher priority when the premises 104 is unoccupied may be selected as an incident, for which to determine a modality (e.g., at the block 302), over a second incident of relatively lower priority when the premises 104 is unoccupied. Conversely, when the electronic data 110 indicates two incidents occurring at times when the premises 104 is generally occupied (e.g., as defined at, for example, the application 222, and which may comprise a range of times from 6 am to 6 pm), a first incident that is more likely to be of relatively higher priority when the premises 104 is occupied may be selected as an incident, for which to determine a modality (e.g., at the block 302), over a second incident of relatively lower priority when the premises 104 is occupied. For example, a nearby flood incident may be selected as relatively higher priority, when determination of the flood incident occurs at a time when the premises 104 is designated as unoccupied, at least relative to a suspicious package incident that is determined at the same time; however, the suspicious package incident may be selected as relatively higher priority when determination of the suspicious package incident occurs at a time when the premises 104 is designated as occupied, at least relative to a nearby flood incident that is determined at the same time.
- A current occupancy of the premises. For example, as described above, some incidents may be of relatively higher priority when the premises 104 is occupied as compared to other incidents, and vice versa. However, in these examples, selection of an incident, for which to determine a modality (e.g., at the block 302) may be based on determined occupancy of the premises 104 rather than a time. For example, occupancy of the premises 104 may be determined via users 116 and/or first persons 118, and the like, and/or any employees and/or visitors at the premises 104, registering respective presence at the computing device 102 via communication devices (e.g., such as the communication devices 114, 120, and the like). Alternatively, users 116 and/or the first persons 118, and the like, may carry electronic identification badges (e.g., RFID badges), which may be presented to card-readers at the premises 104, located, for example at the access points 108, and which may report presence of respective first persons 118 and/or the user 116 to the computing device 102. Card readers may be similarly used by the second persons 122 carrying respective electronic identification badges to register respective presence at the premises 104 and/or at meeting points.
- A weighting scheme. For example, any suitable weighting scheme may be implemented, which weights incidents according to one or more of incident type, type of electronic data 110 used to determine the incident, whether or not an incident is verified, time of day, occupancy of the premises 104, among other possibilities. For example, when an incident occurs, given respective weights may be used for one or more of such factors. In one example, when a fire incident is determined using physical sensor data, at a given time and/or a given occupancy of the premises 104, given weights of "50" for the incident type, "20" for the physical sensor data, and "10" for a given time (e.g., assuming the fire incident is determined between 6 pm and 6 am) may be used; similarly, when a suspicious package incident is determined using video data, at a given time and/or a given occupancy of the premises 104, given weights of "20" for the incident type, "70" for the video data, and "30" for a given time (e.g., assuming the suspicious package incident is determined between 6 pm and 6 am, the same times as for the fire incident) may be used. Hence, the fire incident may be assigned a score of "80" (e.g., 50+20+10) whereas the suspicious package incident may be assigned a score of "120" (e.g., 20+70+30). As such, the suspicious package incident may be selected as an incident, for which to determine a modality (e.g., at the block 302) over the fire incident. Put another way, a first incident of relatively higher weight, may be selected as an incident, for which to determine a modality (e.g., at the block 302), over a second incident of relatively lower weight.

In some examples, the method 300 may further comprise the controller 218 and/or the computing device 102: receiving electronic registration data indicative of respective locations of one or more of the first persons 118 or one or more of the second persons 122; and including, in the one or more notifications, the respective locations.

For example, the communication device 114 of the user 116 may be used to provide locations of the first persons 118 to the computing device 102 in the form of registration data, and the like; such registration data may comprise attendance data indicating a classroom and/or room in which the first persons 118 are currently located (e.g., which may be stored in the schedule data 132). Alternatively, while not depicted, one or more of the first persons 118 may be operating respective communication devices, which may be used to register respective locations of the one or more first persons 118 with the computing device 102. Alternatively, the user 116 and/or the first persons 118 may carry electronic identification badges (e.g., RFID badges), which may be presented to card-readers at the premises 104, located, for example at the access points 108, and which may report presence of respective first persons 118 and/or the user 116 to the computing device 102.

Similarly, the second persons 122 may operate respective communication devices 120 to register their locations with the computing device 102, for example when they arrive at the premises 104 and/or at a designated meeting point. Indeed, in some examples, the second persons 122 may operate respective communication devices 120 to register their contact information (e.g., email address, phone number, and the like) such that when an incident occurs at the premises the computing device 102 may notify the second persons 122 via their respective communication devices 120 of a designated meeting point to meet a respective first person 118. When a second person 122 arrives at the designated meeting point, the second person 122 may operate a respective communication device 120 to register their location at the designated meeting point. Alternatively, such registration may occur using electronic identification cards and card readers (e.g., located at designated meeting points of the premises 104)

Hence, in these examples, the controller 218 and/or the computing device 102 may include respective locations of the first persons 118 and/or the second persons 122 in the notification(s) of the block 308, such that the user 116 is informed of the respective locations. Indeed, when the notification of the block 308 includes respective locations of the second persons 122, the user 116 may be further informed of which second persons 122 (e.g., such as which parents of the first persons 118, and/or which first responders and/or fire marshals, and the like) are at a designated meeting point.

Hence, it is understood that certain aspects of the method 300 may be implemented numerically.

However, in other examples, the method 300 may include the controller 218 and/or the computing device 102: determining one or more of a modality of an incident (e.g., at the block 302), one or more routes (e.g., at the block 304) and electronic reunification data 130 (e.g., at the block 304) using one or more machine-learning algorithms; and implementing a machine-learning feedback loop for training the one or more machine-learning algorithms, the machine-learning feedback loop comprising processing feedback indicative of an evaluation of one or more of the modality of the incident, the one or more routes, or the electronic reunification data 130 as determined by the one or more machine-learning algorithms.

For example, one or more determined modalities of one or more incidents, one or more determined electronic routes 128 and one or more determined sets of electronic reunification data 130 may be provided to one or more machine-learning algorithms (e.g., which may be components of the application 222) in a machine-learning feedback loop as training data and/or labelled training data. In particular, one or more determined modalities of one or more incidents, one or more determined electronic routes 128 and/or one or more determined sets of electronic reunification data 130 may be provided as a training set of feedback for training the one or more machine-learning algorithms to better determine one or more modalities of one or more incidents, and/or one or more electronic routes 128 and/or one or more sets of electronic reunification data 130. Such a training set may further include factors that lead to such determinations, including, but not limited to, electronic data 110 and/or schedule data 132, and the like. Such a training set may be used to initially train the one or more machine learning algorithms.

Further, one or more later determined modalities of one or more incidents, one or more later determined electronic routes 128 and/or one or more later determined sets of electronic reunification data 130 (e.g., as determined by the one or more machine learning algorithms) may be labelled to indicate whether the one or more later determined modalities of one or more incidents, one or more later determined electronic routes 128 and/or one or more later determined sets of electronic reunification data 130, as generated by the one or more machine-learning algorithms, represent positive (e.g., effective) examples or negative (e.g., ineffective) examples.

For example, the one or more machine-learning algorithms may, when determining modalities of incidents, electronic routes 128 and/or electronic reunification data 130, also generate an associated respective probability score, for example on a scale of 0 to 100, with higher scores indicating a higher level of respective confidence in predicting and/or generating modalities of incidents, electronic routes 128 and/or electronic reunification data 130; hence, modalities of incidents, electronic routes 128 and/or electronic reunification data 130 may be labelled with the scores in feedback to the one or more machine-learning algorithms. Put another way, such labels may comprise respective scores of modalities of incidents, electronic routes 128 and/or electronic reunification data 130. In one example, however, such scores may be binary with, for example, a score of "0" indicating a negative example and a score of "1" indicating a positive example. In yet further examples, only positive examples of sets of modalities of incidents, electronic routes 128 and/or electronic reunification data 130 may be provided to the one or more machine-learning algorithms in a machine-learning feedback loop (e.g., which may or may not be labeled as a binary score of "1" may be understood to be inherent in such examples), for example along with respective electronic data 110 and/or schedule data 132. However, any suitable scoring scheme is within the scope of the present specification Regardless, when modalities of incidents, electronic routes 128 and/or electronic reunification data 130 are provided to one or more machine-learning algorithms in the machine-learning feedback loop, the one or more machine-learning algorithms may be better trained to determine modalities of incidents, electronic routes 128 and/or electronic reunification data 130 on the basis of the labels and/or the scores.

In some examples, at least a portion of feedback to one or more machine learning algorithms may be generated at one or more communication devices 114. For example, one or more users 116 may review modalities of incidents, electronic routes 128 and/or electronic reunification data 130 at a respective communication device 114, and manually enter an associated score example to label modalities of incidents, electronic routes 128 and/or electronic reunification data 130 with the score. Such feedback may be provided to the computing device 102 by a communication device 114 for use by a machine-learning feedback loop. However, such scoring using manual input may be implemented at any suitable computing device of the system 100, for example via a computer terminal and/or laptop operated by one or more administrators, and the like.

In some of these examples, one or more users 116, and the like, may be tasked with verifying labels and/or scores of modalities of incidents, electronic routes 128 and/or electronic reunification data 130 via a respective communication device 114, and the like, when scores are below a threshold score such as 50%, 60% and/or any other suitable threshold score.

In other examples, modalities of incidents, electronic routes 128 and/or electronic reunification data 130 generated by one or more machine-learning algorithms may be provided to a feedback computing device (not depicted), which may be a component of the system 100 and/or external to the system 100 that has been specifically trained to generate labels and/or scores for modalities of incidents, electronic routes 128 and/or electronic reunification data 130, and/or verify labels and/or scores of modalities of incidents, electronic routes 128 and/or electronic reunification data 130. Such a feedback computing device may generate and/or verify labels and/or scores and provide the generated and/or verified labels and/or scores as feedback (and/or at least a portion of the feedback, such as the labels) back to the computing device 102 for storage (e.g., at the memory 124) until a machine-learning feedback loop is implemented.

Put another way, labels and/or scores of feedback for a machine learning algorithm may be generated and/or provided in any suitable manner and/or by any suitable computing device and/or communication device.

Furthermore, feedback for a machine learning algorithm is generally indicative of an evaluation of modalities of incidents, electronic routes 128 and/or electronic reunification data 130.

Hence, by implementing a machine-learning feedback loop, more efficient operation of the computing device 102 may be achieved, and/or a change in operation of the computing device 102 may be achieved, as one or more machine-learning algorithms are trained to better and/or more efficiently determine modalities of incidents, electronic routes 128 and/or electronic reunification data 130.

Put another way, a first training set may be generated from initial modalities of incidents, initial electronic routes 128 and/or initial electronic reunification data 130, in any suitable manner, for example via a feedback computing device, and/or that has been generated in any suitable manner; such initial modalities of incidents, initial electronic routes 128 and/or initial electronic reunification data 130 may be indicative of positive examples of modalities of incidents, electronic routes 128 and/or electronic reunification data 130. The first training set may be used to train one or more machine-learning algorithms, in a first stage of a machine-learning feedback loop, to determine one or more of modalities of incidents, electronic routes 128 and/or electronic reunification data 130. Similarly, a second training set may be generated from one or more of initial modalities of incidents, initial electronic routes 128 and/or initial electronic reunification data 130 collected and/or generated, in any suitable manner that are indicative of negative examples of modalities of incidents, electronic routes 128 and/or electronic reunification data 130. The second training set may be used to further train the one or more machine-learning algorithms, in the first stage of the machine-learning feedback loop. Similarly, after one or more machine-learning algorithms are trained using the first training set of positive examples and the second training set of negative examples, in a second stage of a machine-learning feedback loop, the one or more machine-learning algorithms may be further trained using a fourth training set of positive examples of one or more of modalities of incidents, electronic routes 128 and/or electronic reunification data 130 and/or a fifth training set of negative examples of one or more of modalities of incidents, electronic routes 128 and/or electronic reunification data 130. Furthermore, the first training set and the second training set may be used in any suitable order to train one or more machine-learning algorithms in the first stage, and similarly the third training set and the fourth training set may be used in any suitable order to train the one or more machine-learning algorithms in the second stage. Indeed, components of the first training set and the second training set, and/or components of the third training set and the fourth training set, may be used to train the one or more machine-learning algorithms in any suitable order.

Figure 4:
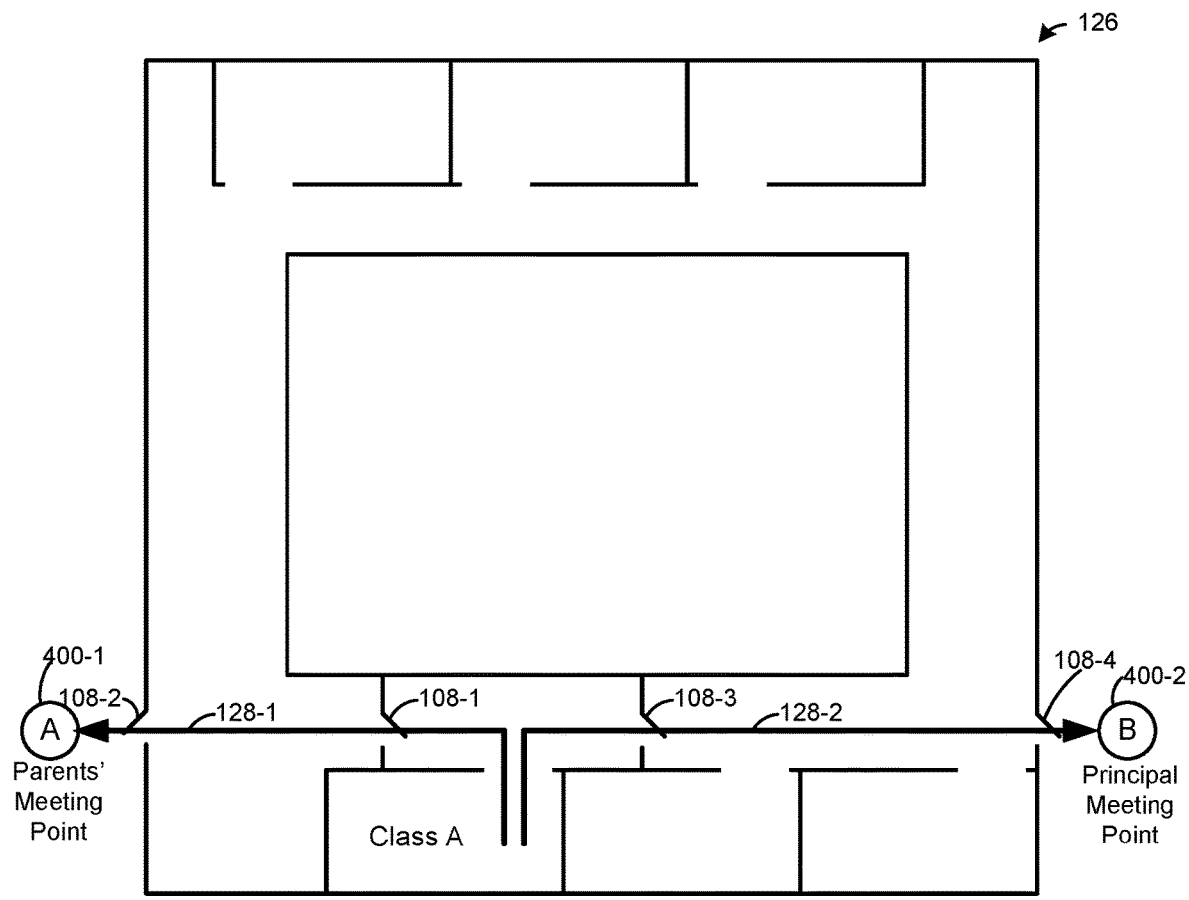
FIG. 4 depicts examples of electronic reunification data and electronic routes for different modalities of incidents, as determined by a computing device of the system of FIG. 1, in accordance with some examples.

Attention is next directed to FIG. 4, which depicts aspects of the method 300. In particular, FIG. 4 depicts examples of different electronic routes 128 and different electronic reunification data 130 may be determined based on different modalities for an incident. In particular, FIG. 4 depicts the electronic map 126 (e.g., of a building of the premises 104), and two electronic routes 128-1, 128-2 from a classroom (e.g., "Class A") of the premises 104 to respective meeting points 400-1, 400-2. As depicted, the meeting point 400-1 comprises a "Parents' Meeting Point", also labelled as meeting point "A", and the meeting point 400-2 comprises a "Principal Meeting Point", also labelled as meeting point "B".

As the meeting points 400-1, 400-2 are depicted as being external to a building of the premises 104, FIG. 4 further illustrates that portions of the electronic routes 128 may be external to the premises 104, and/or that the premises 104 may include areas external to buildings.

Furthermore, along a first electronic route 128-1, the electronic map 126 indicates presence of access points 108-1, 108-2. Similarly, along a second electronic route 128-2, the electronic map 126 indicates presence of access points 108-3, 108-4. The access points 108-1, 108-2, 108-3, 108-4 are understood to be in communication with the computing device 102 and are further understood to be controllable by the computing device 102.

In one example, when a modality of an "active incident" (e.g., at the block 302 of the method 300) is determined by the computing device 102 for an incident, first electronic reunification data 130 comprising the first electronic route 128-1 from the classroom to a first meeting point 400-1 may be selected by the computing device 102 (e.g., at the block 304 of the method 300) to reunite the first persons 118 with second persons 122 who are parents of the first persons 118. Furthermore, in this example, the computing device 102 is understood to control the access points 108-1, 108-2 along the first electronic route 128-1 to one or more of open and unlock (e.g., at the block 306 of the method 300). However, the access points 108-3, 108-4 may be controlled by the computing device to one or more of close and lock.

Similarly, in another example, when a modality of an "incident drill" (e.g., at the block 302 of the method 300) is determined by the computing device 102 for an incident, second electronic reunification data 130 comprising a second electronic route 128-2 from the classroom to a second meeting point 400-2 may be selected by the computing device 102 (e.g., at the block 304 of the method 300) to reunite the first persons 118 with a second person 122 who is a principal of a school of the premises 104 (e.g., the principal may comprise a second person 122). Furthermore, in this example, the computing device 102 is understood to control the access points 108-3, 108-4 along the second electronic route 128-2 to one or more of open or unlock (e.g., at the block 306 of the method 300). However, the access points 108-1, 108-2 may be controlled by the computing device to one or more of close or lock.

It is furthermore understood that the first electronic route 128-1 may be generated to avoid a threat (e.g., such as a fire) that may be occurring along the second electronic route 128-2.

Figure 5:
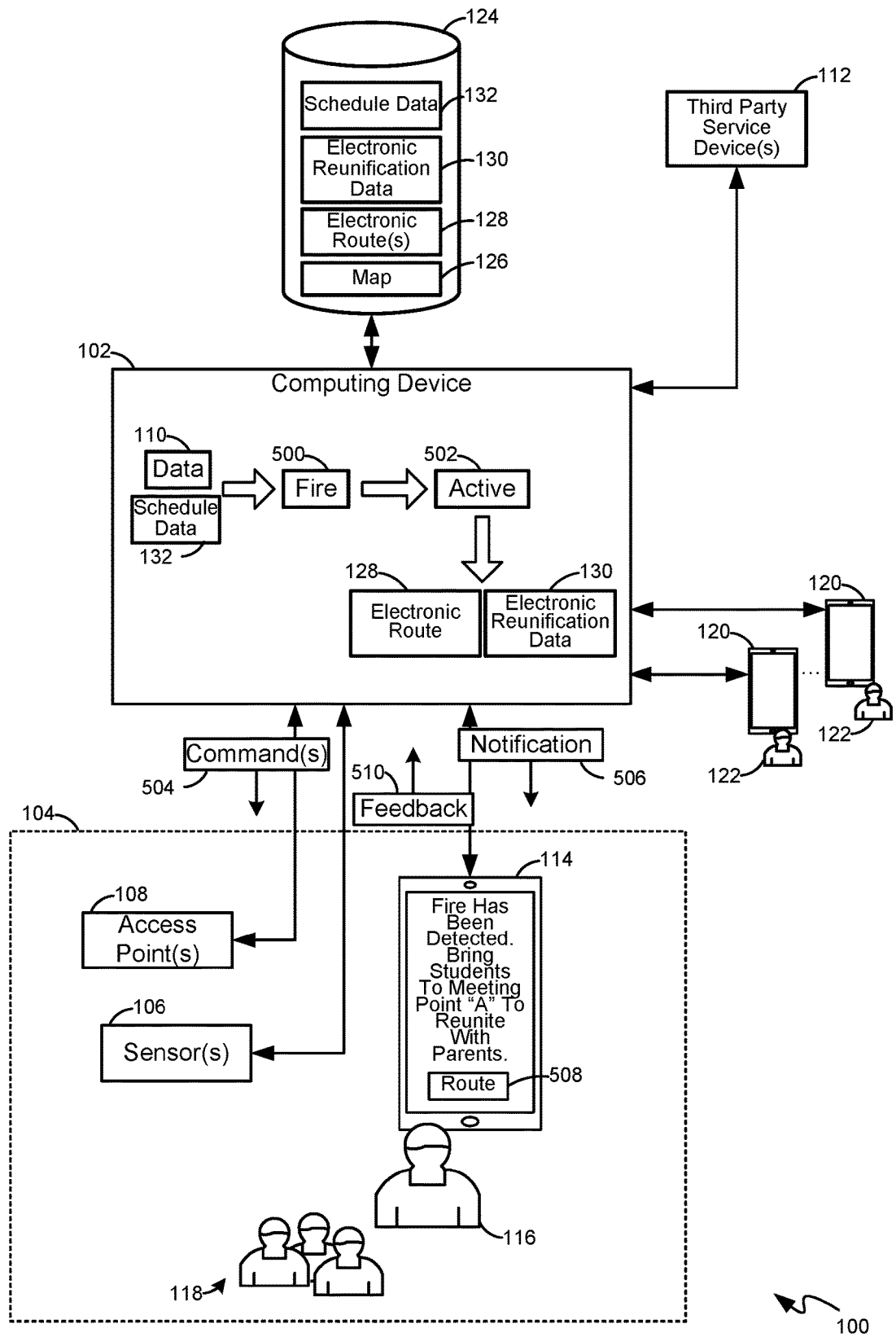
FIG. 5 depicts aspects of a method for electronic access control to reunify persons being implemented by a computing device of the system of FIG. 1, in accordance with some examples.

Attention is next directed to FIG. 5, which depicts further aspects of the method 300. In particular, FIG. 5 is substantially similar to FIG. 1 with like components having like numbers.

FIG. 5 depicts the computing device 102 determining that an incident 500 of a "Fire" is occurring, from the electronic data 110 (and/or the schedule data 132, which may also comprise electronic data). FIG. 5 further depicts the computing device 102 determining (e.g., at the block 302 of the method 300) that the incident 500 has a modality 502 of an "Active" incident. FIG. 5 further depicts the computing device 102 determining (e.g., at the block 304 of the method 300) an electronic route 128 and electronic reunification data 130 that may be specifically associated with the first persons 118 (e.g., and/or the user 116 and/or the communication device 114 and/or their respective location, such as "Classroom A").

FIG. 5 further depicts the computing device 102 controlling (e.g., at the block 306 of the method 300) access points 108 along the determined electronic route 128 to one or more of open or unlock, by transmitting one or more commands 504 to the access points 108. Other commands 504 may control access points 108 that are not along the determined electronic route 128 to one or more of close or lock.

FIG. 5 further depicts the computing device 102 transmitting (e.g., at the block 308 of the method 300) a notification 506 to the communication device 114, the notification 506 indicative of the electronic reunification data 130 determined by the computing device 102. For example, for an active incident of a fire, the electronic reunification data 130 may indicate that the first persons 118 are to be reunited with their parents. As such, the notification 506 may include text that may cause the communication device 114 to provide (e.g., at a display screen thereof) text of "Fire Has Been Detected. Bring Students To The Meeting Point "A" To Reunite With Parents." As depicted, the notification 506 may further include a command that may cause the communication device 114 to provide (e.g., at a display screen thereof) an electronic button 508, labelled "Route", which, when actuated, may cause the communication device 114 to retrieve the electronic map 126 and an indicator of the electronic route 128 determined by the computing device 102. In a particular example, when the electronic button 508 is actuated, the communication device 114 may render the electronic map 126 and the electronic route 128-1 as depicted in FIG. 4. However, the electronic route 128-1 may be provided in any suitable manner including, but not limited to, as textual directions and/or as audio directions output from a speaker of the communication device 114. However, in other examples, the electronic route 128-1 may not be provided; rather, the information of "Meeting Point "A" in the notification 506 may be sufficient for the user 116 to lead the first persons 118 according to the electronic route 128-1.

FIG. 5 further depicts the computing device 102 providing feedback 510 to the computing device 102, which may be used by the computing device to train one or more machine learning languages to better determine one or more of modalities of an incident, electronic routes 128 and/or electronic reunification data 130. For example, the feedback 510 may comprise one or more scores for the modality 502, the electronic route 128 of FIG. 5, or the electronic reunification data 130 of FIG. 5.

While not depicted, the computing device 102 may also transmit notifications to the communication devices 120 of the second persons 122 (e.g., when the communication devices 120 and the second persons 122 are at a meeting point) indicating that the first persons 118 are on their way, and/or have arrived at a meeting point.

As should be apparent from this detailed description above, the operations and functions of electronic computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, cannot control a display screen, cannot implement a machine learning algorithm, nor implement a machine learning algorithm feedback loop, and the like).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together). Similarly the terms "at least one of" and "one or more of", without a more limiting modifier such as "only one of", and when applied herein to two or more subsequently defined options such as "at least one of A or B", or "one or more of A or B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context, in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:

determining, via a computing device, using electronic data, a modality of an incident associated with a premises;

determining, via the computing device: one or more routes associated with the premises and the modality; and electronic reunification data associated with the modality, the electronic reunification data defining one or more first persons and one or more second persons that are to meet in association with the incident and in accordance with the one or more routes, wherein different modalities are associated with one or more of different routes and different persons, wherein the different modalities comprise different incident types, the one or more second persons with which the one or more first persons are to meet change depending on an incident type of the incident;

controlling, via the computing device, access points at the premises, along the one or more routes, to one or more of unlock, lock, open, or close; and transmitting, via the computing device, one or more notifications to one or more communication devices, indicative of the electronic reunification data, the one or more notifications transmitted after the electronic reunification data is determined, and prior to the one or more first persons and the one or more second persons meeting.

2. The method of claim 1, wherein the electronic data comprises one or more of:

video data from video cameras associated with the premises;

fire detector data associated with the premises;

physical alarm data associated with the premises;

sensor data from sensors associated with the premises;

social media data associated with the premises;

GIS (geographic information service) data associated with the premises;

a schedule associated with the premises; or weather data associated with the premises.

3. The method of claim 1, wherein determining the electronic reunification data comprises:

selecting the electronic reunification data from a plurality of sets of electronic reunification data, based on the modality.

4. The method of claim 1, wherein the modality of the incident comprises one of:

an active incident;

a false incident;

a preventive incident; and an incident drill.

5. The method of claim 1, wherein the one or more notifications further comprises an indication of one or more of:

the incident;

the modality of the incident; or a type of the incident.

6. The method of claim 1, further comprising:

for a given communication device, of the one or more communication devices, selecting a given route, of the one or more routes based on an associated user of the given communication device; and including in a notification to the given communication device, the given route.

7. The method of claim 1, further comprising:

prior to determining the modality of the incident, determining, using first electronic data, an initial incident;

determining, using second electronic data, that the initial incident is a false incident, and the incident is a real incident; and in response to determining that the incident is the real incident, determining the modality of the incident.

8. The method of claim 1, further comprising:

receiving electronic registration data indicative of respective locations of one or more of the first persons and one or more of the second persons; and including, in the one or more notifications, the respective locations.

9. The method of claim 1, further comprising:

determining, using electronic data, a plurality of incidents associated with the premises; and selecting, using electronic data, the incident from the plurality of incidents according to one or more of:

a weighting scheme;

a type of the incident;

a current time of day; or a current occupancy of the premises.

10. The method of claim 1, wherein the electronic reunification data is one or more of: predetermined; and determined using one or more machine learning algorithms.

11. A device comprising:

a communication unit; and a controller configured to:

determine, using electronic data, a modality of an incident associated with a premises;

determine: one or more routes associated with the premises and the modality; and electronic reunification data associated with the modality, the electronic reunification data defining one or more first persons and one or more second persons that are to meet in association with the incident and in accordance with the one or more routes, wherein different modalities are associated with one or more of different routes and different persons, wherein the different modalities comprise different incident types, the one or more second persons with which the one or more first persons are to meet change depending on an incident type of the incident;

control, via the communication unit, access points at the premises, along the one or more routes, to one or more of unlock, lock, open, or close; and transmit, via the communication unit, one or more notifications to one or more communication devices, indicative of the electronic reunification data, the one or more notifications transmitted after the electronic reunification data is determined, and prior to the one or more first persons and the one or more second persons meeting.

12. The device of claim 11, wherein the electronic data comprises one or more of:

video data from video cameras associated with the premises;

fire detector data associated with the premises;

physical alarm data associated with the premises;

sensor data from sensors associated with the premises;

social media data associated with the premises;

GIS (geographic information service) data associated with the premises;

a schedule associated with the premises; or weather data associated with the premises.

13. The device of claim 11, wherein the controller is further configured to determine the electronic reunification data by:

selecting the electronic reunification data from a plurality of sets of electronic reunification data, based on the modality.

14. The device of claim 11, wherein the modality of the incident comprises one of:
   an active incident;
   a false incident;
   a preventive incident; and
   an incident drill.

15. The device of claim 11, wherein the one or more notifications further comprises an indication of one or more of:
   the incident;
   the modality of the incident; or
   a type of the incident.

16. The device of claim 11, wherein the controller is further configured to:
   for a given communication device, of the one or more communication devices, select a given route, of the one or more routes based on an associated user of the given communication device; and
   include in a notification to the given communication device, the given route.

17. The device of claim 11, wherein the controller is further configured to:
   prior to determining the modality of the incident, determining, use first electronic data, an initial incident;
   determine, using second electronic data, that the initial incident is a false incident, and the incident is a real incident; and
   in response to determining that the incident is the real incident, determine the modality of the incident.

18. The device of claim 11, wherein the controller is further configured to:
   receive electronic registration data indicative of respective locations of one or more of the first persons and one or more of the second persons; and
   include, in the one or more notifications, the respective locations.

19. The device of claim 11, wherein the controller is further configured to:
   determine, using electronic data, a plurality of incidents associated with the premises; and
   select, using electronic data, the incident from the plurality of incidents according to one or more of:
   a weighting scheme;
   a type of the incident;
   a current time of day; or
   a current occupancy of the premises.

20. The device of claim 11, wherein the electronic reunification data is one or more of: predetermined; and determined using one or more machine learning algorithms.

* * * * *